(12) United States Patent
Takada

(10) Patent No.: US 10,754,818 B2
(45) Date of Patent: Aug. 25, 2020

(54) MULTIPROCESSOR DEVICE FOR EXECUTING VECTOR PROCESSING COMMANDS

(71) Applicant: ArchiTek Corporation, Osaka (JP)

(72) Inventor: Shuichi Takada, Osaka (JP)

(73) Assignee: ArchiTek Corporation, Osaka (JP)

( * ) Notice: Subject to any disclaimer, the term of this patent is extended or adjusted under 35 U.S.C. 154(b) by 0 days.

(21) Appl. No.: 15/317,183

(22) PCT Filed: Aug. 5, 2015

(86) PCT No.: PCT/JP2015/072246
§ 371 (c)(1),
(2) Date: Dec. 8, 2016

(87) PCT Pub. No.: WO2016/024508
PCT Pub. Date: Feb. 18, 2016

(65) Prior Publication Data
US 2017/0116153 A1    Apr. 27, 2017

(30) Foreign Application Priority Data

Aug. 12, 2014 (JP) .................. 2014-164137

(51) Int. Cl.
*G06F 15/80* (2006.01)
*G06F 9/30* (2018.01)
(Continued)

(52) U.S. Cl.
CPC ............ *G06F 15/80* (2013.01); *G06F 9/3012* (2013.01); *G06F 9/32* (2013.01); *G06F 9/34* (2013.01);
(Continued)

(58) Field of Classification Search
None
See application file for complete search history.

(56) References Cited

U.S. PATENT DOCUMENTS 4,779,192 A * 10/1988 Torii .................. G06F 9/30025
708/441
5,513,366 A * 4/1996 Agarwal ............ G06F 9/30036
712/2
(Continued)

FOREIGN PATENT DOCUMENTS

JP    2008-217061 A    9/2008
JP    2009-037593 A    2/2009

*Primary Examiner* — George Giroux
(74) *Attorney, Agent, or Firm* — Studebaker & Brackett PC

(57) ABSTRACT

A multiprocessor device includes external memory, processors, a memory aggregate unit, register memory, a multiplexer, and an overall control unit. The memory aggregate unit aggregates memory accesses of the processors. The register memory is prepared by a number equal to the product of the number of registers managed by the processors and the maximum number of processes of the processors. The multiplexer accesses the register memory according to a command given against register access of the processors. The overall control unit extracts a parameter from the command and provides the parameter to the processors and multiplexer, and controls them, as well as has a given number of processes consecutively processed using the same command while having addressing for the register memory changed by the processors, and when the given number of processes ends, has the command switched to a next command and processing repeated for a given number of processes.

11 Claims, 13 Drawing Sheets

(51) Int. Cl.
*G06F 9/38* (2018.01)
*G06T 1/20* (2006.01)
*G06F 17/16* (2006.01)
*G06F 9/32* (2018.01)
*G06F 9/34* (2018.01)

(52) U.S. Cl.
CPC .......... *G06F 9/3824* (2013.01); *G06F 9/3851* (2013.01); *G06F 9/3887* (2013.01); *G06F 15/8053* (2013.01); *G06F 17/16* (2013.01); *G06T 1/20* (2013.01)

(56) References Cited

U.S. PATENT DOCUMENTS

| | | | |
|---|---|---|---|
| 5,790,879 A * | 8/1998 | Wu | G06F 15/8007 |
| | | | 711/109 |
| 6,785,800 B1 * | 8/2004 | Yamaura | G06F 9/30036 |
| | | | 712/22 |
| 8,693,534 B1 * | 4/2014 | Lewis | H04N 19/433 |
| | | | 345/506 |
| 2003/0070059 A1 | 4/2003 | Dally et al. | |
| 2007/0294694 A1 * | 12/2007 | Jeter | G06F 9/30123 |
| | | | 718/102 |
| 2008/0209165 A1 | 8/2008 | Ozaki | |
| 2008/0282058 A1 | 11/2008 | Maher et al. | |
| 2009/0187737 A1 * | 7/2009 | Ozaki | G06F 9/30014 |
| | | | 712/36 |
| 2010/0115233 A1 * | 5/2010 | Brewer | G06F 9/30036 |
| | | | 712/7 |
| 2010/0287334 A1 * | 11/2010 | Sullam | G06F 12/06 |
| | | | 711/103 |
| 2014/0372651 A1 * | 12/2014 | Kanai | G06F 9/462 |
| | | | 710/261 |

\* cited by examiner

MULTIPROCESSOR DEVICE FOR EXECUTING VECTOR PROCESSING COMMANDS

TECHNICAL FIELD

This invention concerns a multiprocessor device comprising of a plurality of processors.

BACKGROUND ART

In digital signal processing, a processor such as DSP which operates through programming, must to be able to handle various algorithms. In recent years processing volume has increased significantly for processes such as graphics processing etc. For that reason, devices with a plurality of processors such as GPU (graphics processing units) have come to replace DSPs.

Prior example is illustrated using the example of GPU. FIG. 2 shows an implementation of GPU as claimed by Japanese Unexamined Patent Application Publication No. 2009-37593. This GPU consists of an external memory unit (EMU) 201, external memory 202, a vector processing engine (VPE) 205, a vector control unit (VCU) 206, a vector processing unit (VPU) 207.

The vector processing unit (VPU) 207 consists of a plurality of computing units which form the core of a multiprocessor. A higher level control unit, the vector control unit (VCU) 206 along with the VPU forms a set to make the vector processing engine (VPE) 205. The vector processing engine (VPE) 205 further consists of several engines and is crossbar connected through the external memory unit (EMU) 201 which is mutually accessible by all the engines. Further they are also connected to external memory 202 so that memory access is possible.

Data as well as commands which are units of program, are stored in L1 cache of the vector processing unit (VPU) 207 (lowest level 1 cache or temporary storage unit) or L2 cache of the vector processing engine (VPE) 205 (upper level 2 cache or temporary storage unit). Each is a tiered memory access flow.

The more vector processing engines (VPE) 205 are implemented, the more the performance will rise. However the operation of the vector processing engine (VPE) 205 is to execute same instruction at the same time, basically SIMD (single instruction multiple data) type so when the number of the implemented engines increase, memory access becomes concentrated at the same time and due to the bandwidth restrictions of the external memory unit (EMU) 206 or external memory 202, the performance deteriorates. Therefore it is essential to limit the implementation of the vector processing unit (VPU) 207, and instead increase the number of the vector processing engines (VPE) 205. By executing different programs or staggering the time frame of execution of program in the vector processing engine (VPE) 205, the problem of accesses concentrating at the same time can be avoided.

On the other hand, each of the vector processing engine (VPE) 205 will be coupled through the external memory unit (EMU) 201 and will require a mechanism to efficiently exchange data. Data exchange is required to break up a large program into smaller ones (to increase the efficiency of the vector processing unit (VPU) 207). In order to escape the complexity of programming, these data exchanges are automatically done independent of the program.

Method for automatically performing data exchange is described. First need to define memory access request, transfer source and transfer destination message. Each device issues or receives each of the above and processes it. Multiple messages are arbitrated at each device and are processed in parallel honoring the order. Messaging operations are mainly processed by a DMA (Direct Memory Access) device in each of the vector processing engine (VPE). Through this arrangement, data transmission between External Memory 202 and L1 cache of the vector processing unit (VPU) 207 or L2 cache of the vector processing engine (VPE) 207 is automatically accomplished. This process is controlled separately and does not require attention of program.

Next will explain the vector processing unit (VPU) 207. When thinking of SIMD type, it is better to keep in order the number of circuits by compressing them and simplifying the scale of circuit of every unit. Further by simplifying the circuit, can operate at high frequency. Thus, 1 unit will be a simple pipeline structure, and unlike a general purpose processor does not feature high level functions. For example, methods which cost in implementation such as superscalar are not used.

When the structure of processor is simplified, flow dependency becomes a problem. For example, when reading from register A performing pipeline processing and writing to register B, it is necessary to wait till register B write is complete before the next command can read register B. In a large enough program, it is possible to avoid this waiting penalty by scheduling the order of commands, but when the program is smaller due to it being split and distributed, then such scheduling is difficult.

Therefore, it becomes necessary to stop the execution of read for register B for next command until the write to register B of previous command has completed (hazard occurrence). FIG. 3 shows occurrence of hazards when performing pipeline operations as a function of time, and shows the hazards which occur when write of command 1 and read of command 2 use the same register.

To solve this in traditional processors, it was necessary to see that flow dependency does not arise and to run different programs which have completely different contexts as shown in FIG. 4. In FIG. 4, programs ABCD are prepared, and each command is executed one after another. By having different registers for ABCD even when program A writes to a register, other programs BCD read registers do not overlap and can be accessed. Further there is time difference of 3 between program A command A1 and command A2 so even though there is flow dependency hazards do not occur.

Thus, a number of simplified structured processors can be combined, and connected crossbar with commands and data queued and by tweaking the program, can increase the efficiency of the processor as well as distributed usage of memory bandwidth.

CITATION LIST

Patent Documents

Patent document 1: Japanese Unexamined Patent Application Publication No. 2009-37593

SUMMARY OF INVENTION

Problems to be Solved by Invention

However traditional multiprocessor device has below problems.

First, need to properly divide the program. Static method is to beforehand determine the distribution and division of program using compiler. However if additions to program for simultaneous execution are added then again the distribution and division of program needs to be done. This decreases the efficiency of program development.

Dynamic method is to provide a device to monitor the status of each processor. Monitor means that the state of program execution is stored in common memory etc., and the processor accesses this memory to see if a program can be executed and if it is then the program is executed. Or, a separate processor is kept which specifically monitors the state of each processor and executes. In total the hardware gets complex and adds up the cost.

Next, when inter-processor transmissions occur frequently, inter-processor data transmission gets congested and can lead to overheads. Further when trying to increase inter-processor transmission efficiency, bus switch such as crossbar is required and circuit cost increases.

Finally, in order to have one processor execute different programs one after another, such different programs need to be prepared. For example in a traditional plurality of the vector processing engines (VPE) 205 a plurality of programs need to be prepared, which then have to be broken into a further plurality of programs. This means that irrespective of whether static or dynamic method is used, productivity of program lessens. Also, the number of programs provided to 1 processor increase in proportion to the pipeline stages. Therefore, when increasing the pipeline stages and increasing operating frequency or performing complex operations, the problem of dividing the program becomes acute.

Solution to Problem

In order to solve the above mentioned problem, this invention uses the below technical method. A multiprocessor device of this invention includes external memory, a plurality of processors, a memory aggregate unit, register memory, a multiplexer, and an overall control unit. The memory aggregate unit aggregates memory accesses of the plurality of processors. The register memory is prepared by a number equal to the product of the number of registers managed by the plurality of processors and the maximum number of processes of the plurality of processors. The multiplexer accesses the register memory according to a command given against register access of the plurality of processors. The overall control unit extracts a parameter from the command and provides the extracted parameter to the plurality of processors and multiplexer, and controls the plurality of processers and multiplexer. Also, the overall control unit has a given number of processes consecutively processed using same command while having addressing for the register memory changed by each of the plurality of processers, and when the given number of processes ends, has the command switched to a next command and processing repeated for a given number of processes.

Effects of Invention

In this invention, instead of preparing number of registers to correspond to the number of physical processors, a very large logical register corresponding to the number of processors is prepared, and number of operations is automatically adjusted. As a result without considering division of program, a simple parallel processing multiprocessor device is presented. Also adjustment consists of addition/subtraction of number of operations and thus the degree of parallel processing of processors can be added/subtracted simply. Therefore program does not have to keep in mind the number of processors.

Also with this invention, even though the pipeline stage of processor is increased, as well as performance not being influenced by flow dependence, complex operations as well as increase of operating frequency can be easily realized. Increase in memory latency similarly has a minimal effect and complex memory access structure is unnecessary and control is automatically disjointed. Therefore a structure to provide memory access to each processor is only required.

Comparatively a large register will be required, but the cost increase is minimal as low cost SRAM can be used to accommodate the increase in the latitude of pipeline stages.

Update frequency of commands is low so there is no necessity for providing a command cache to increase performance speed and parallelization of operation device requiring very long length word is also simple.

According to the above, this invention presents a multiprocessor device which excels in cost performance and scalability of function and performance as well as easy creation of programs.

DESCRIPTION OF EMBODIMENTS

Below will explain embodiments of this invention using figures.

The first embodiment of this invention which has to do with multiprocessor device is described. Use FIG. 1 and FIGS. 5 to 9 to explain this embodiment.

Figure 1:
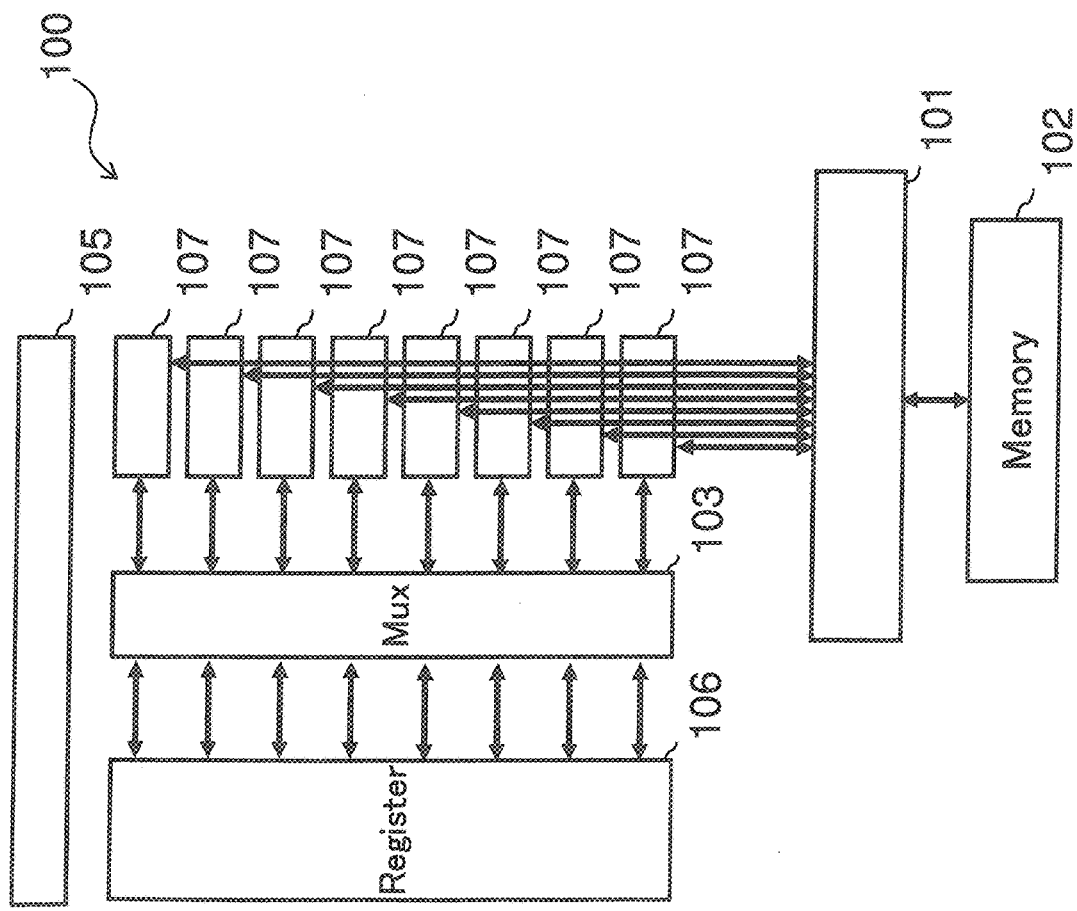
FIG. 1 shows a figure explaining a multiprocessor device in accordance with an embodiment of the present invention.
Figure 2:
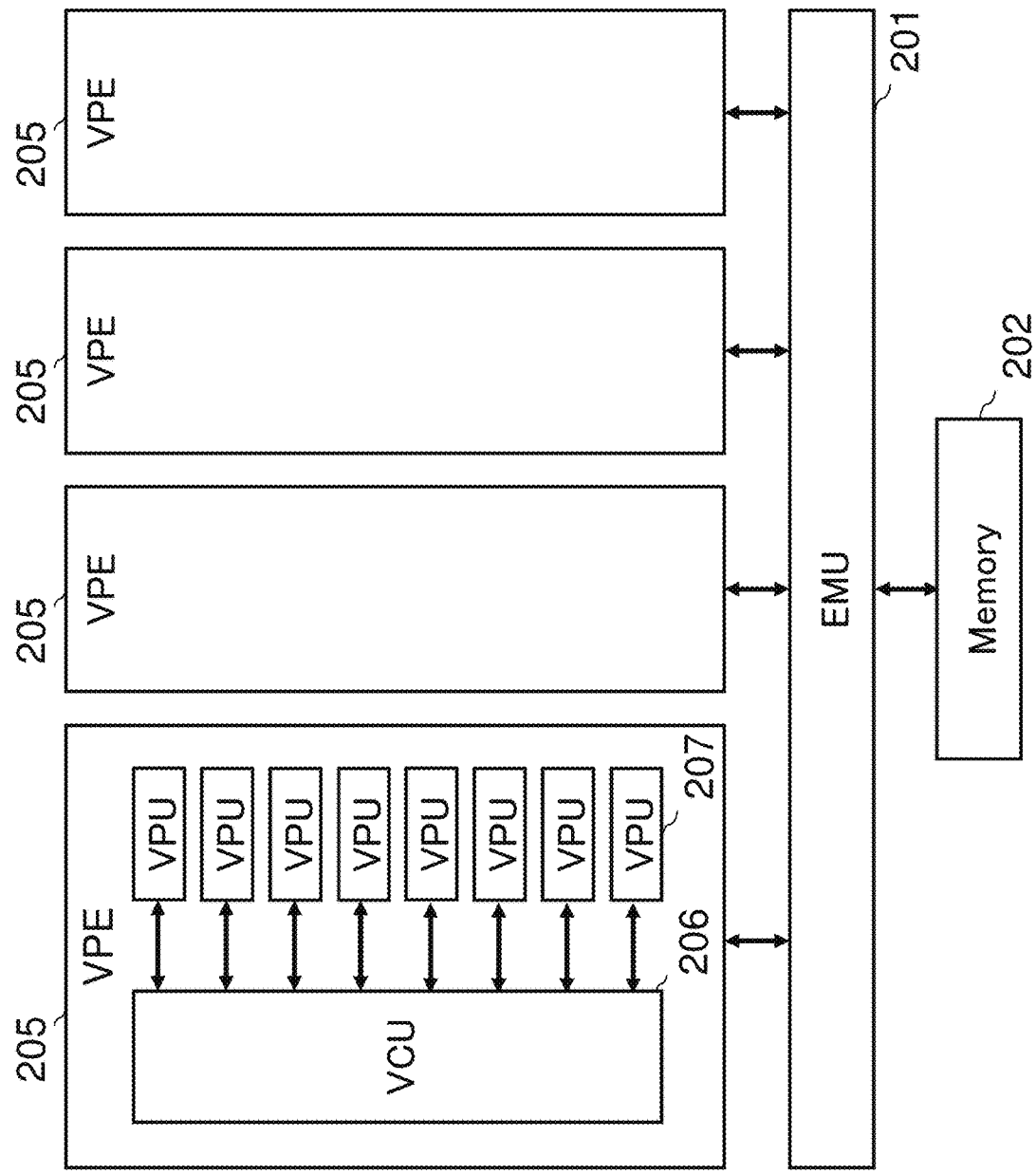
FIG. 2 is a figure explaining the structure of a traditional multiprocessor.
Figure 3:
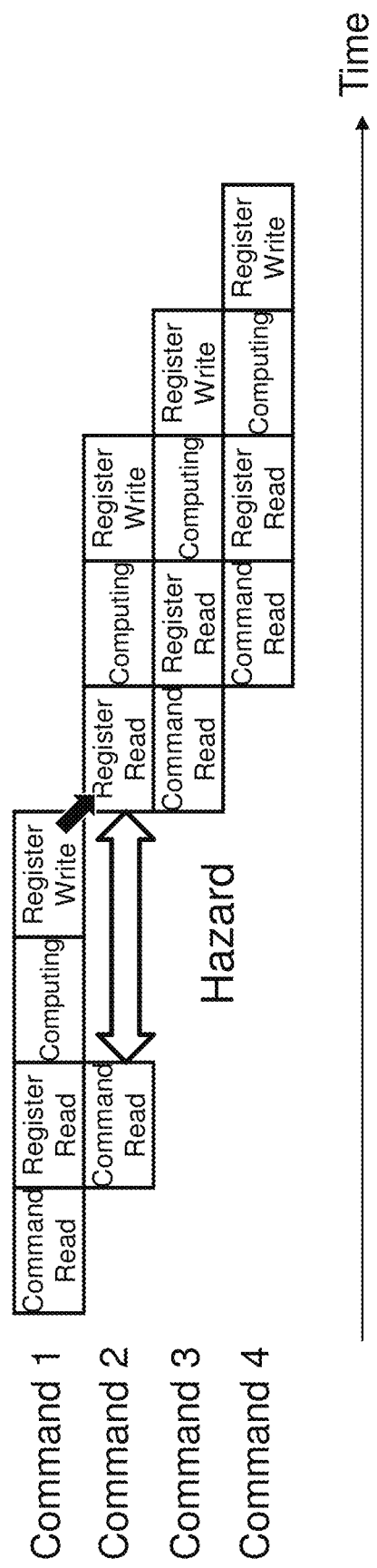
FIG. 3 is a figure explaining pipeline operation in a traditional multiprocessor where hazards do not occur.
Figure 4:
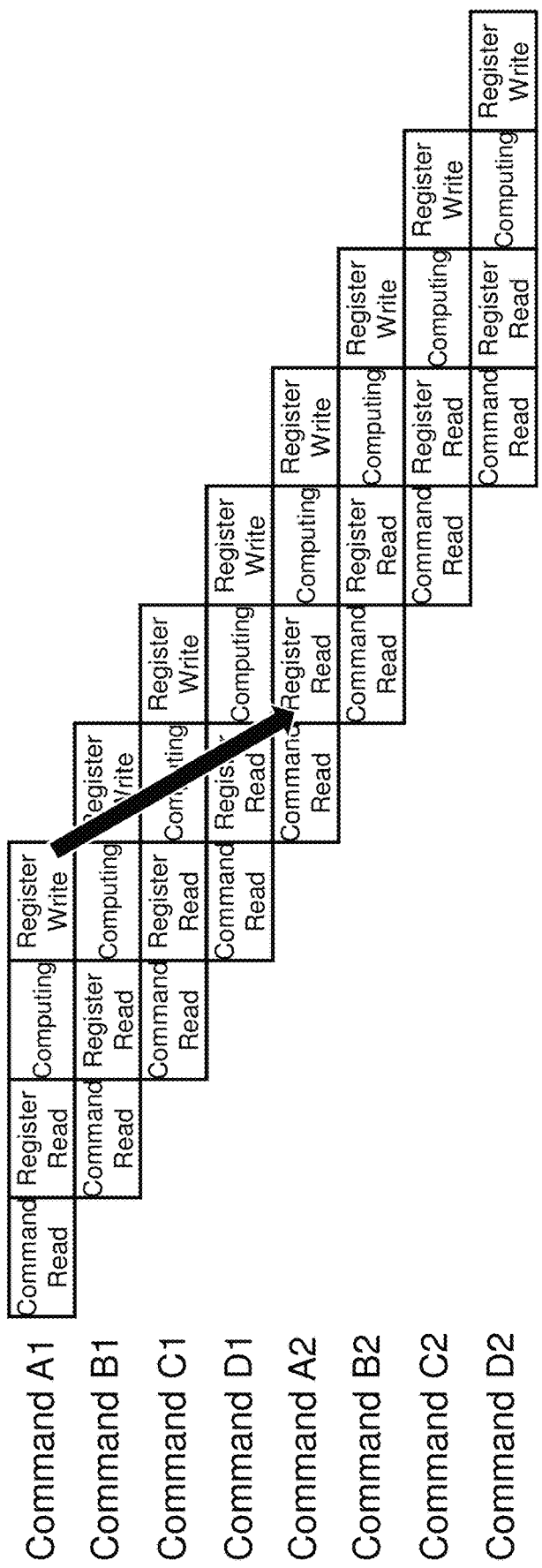
FIG. 4 is a figure that explains pipeline operation in a traditional multiprocessor device where different programs are alternately executed.

A plurality of processor of SIMD type executes single command multiple times. As FIG. 1 show, this multiprocessor device 100 includes a memory aggregate unit 101, external memory 102, a multiplexer 103, an overall control unit 105, register memory 106, a plurality of processor 107. The memory aggregate unit 101 accumulates memory access of the plurality of the processors 107. The multiplexer 103 accesses the register memory 106 according to the register access command provided by the processor 107.

In this example, there are physically 8 of the processors 107, which can logically process SIMD type 1024 operations (maximum process). The register memory 106 is a register which can read/write from the processor 107, thus the number of registers provided is proportional to the number of logical number of processors. For example, if 1 processor has 16 registers then need to provide 16×1024=16384 registers. As a consequence, logical registers are equivalent to 1024 processors (16384 registers), which can perform maximum 8 operations physically for each unit time (1 cycle).

When command for N operations is given to the 8 processors 107, addressing for registers is changed and command given for N operations is successively performed. Addressing referred here means access of address given to each physical processor (8×16 register) for the register memory 106. For example, when the number of operations N=300, 38 times addressing is done. In this case, for 37 times addressing the 8 processors 107 process commands and for the last 1 time addressing the 4 processors 107 process the command. Thus, addressing is changed from 0 to 37. Processor is structured as a pipeline, and if 1 command is assumed to complete in 1 cycle then N-300 operations can be processed in 38 cycles. The overall control unit 105 controls the number of executions. In other words, the overall control unit 105 successively processes given number of operations by changing the addressing of the register memory 106 of the processor 107 using same given command. Also, the overall control unit 105, repeatedly processes successive commands as soon as the operation given to the processor 107 finishes. Although not restricted, here the command is stored in the external memory 102. Also the overall control unit 105, extracts parameters from commands and feeds these to the processor 107 and the multiplexer 103 and controls.

Figure 5:
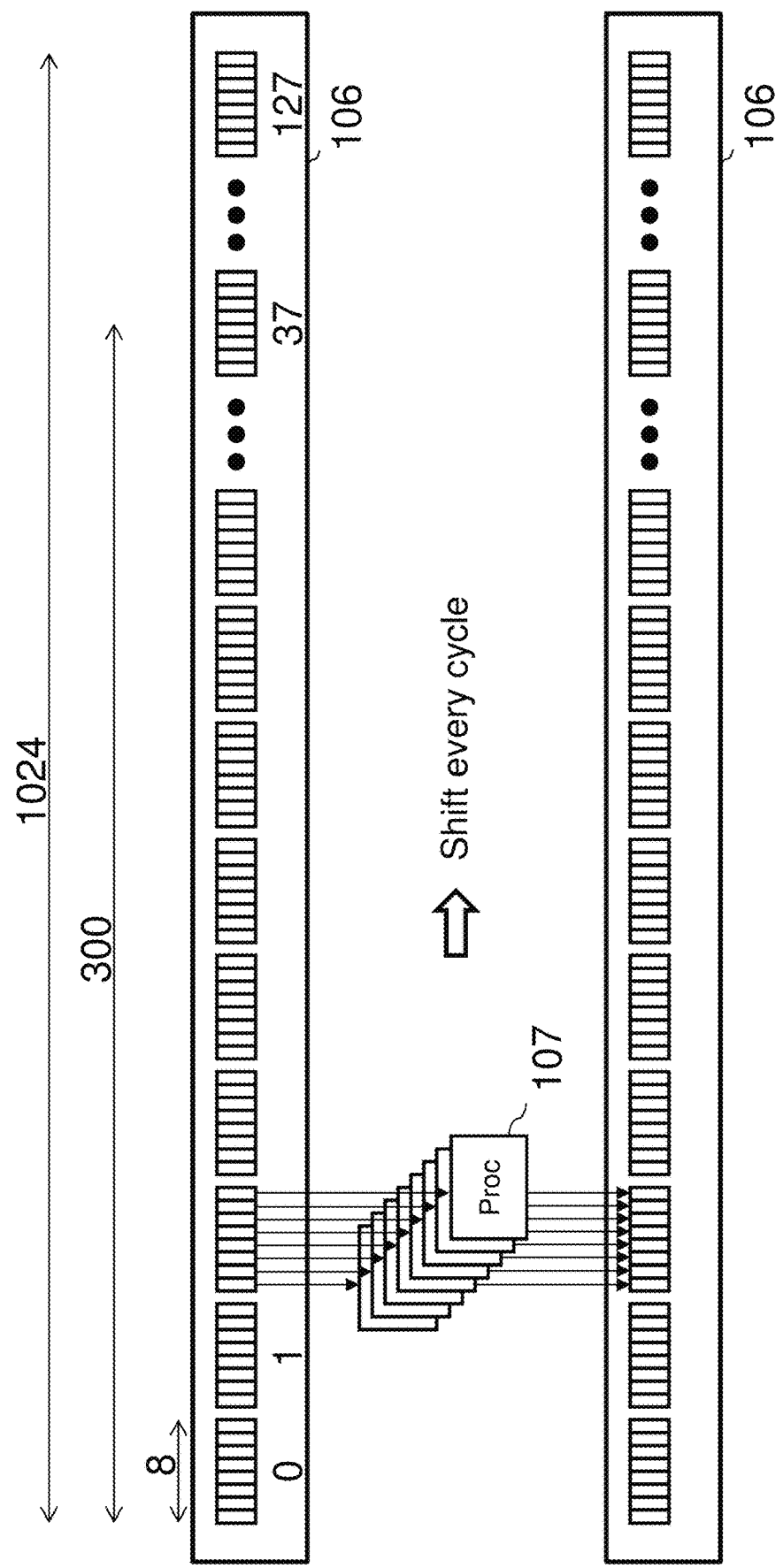
FIG. 5 is a figure which explains register access in the multiprocessor device in accordance with an embodiment of the present invention.

FIG. 5 shows the above operation. Here will separate the register memory 106 read and write for clarity. In FIG. 5, the processor 107 addresses the inter register memory 106 every 1 cycle in ascending order and performs total N=300 operations.

As mentioned above, in the register memory 106, read and write occurs. For example, in 2 item computation, out of 16 registers allocated to a processor, 2 are used for read and 1 for write. Which register is to be selected as operand is determined by command which has operand number written and provided to the multiplexer 103 which switches according to operand number.

Here the register memory 106 accepts access from the 8 processors 107 at the same time, but since all 8 commands are the same, the operand numbers are also the same. Hence, the multiplexer 103 must ensure same switching and same addressing for each of the processor 107. However, it is necessary to divide 16 registers into maximum 16 register groups so that they can be multiply selected at the same time.

To maximize throughput, it is necessary to read and write at the same time. This can be obtained by using 16 banks of 2 port SRAMs.

Figure 6:
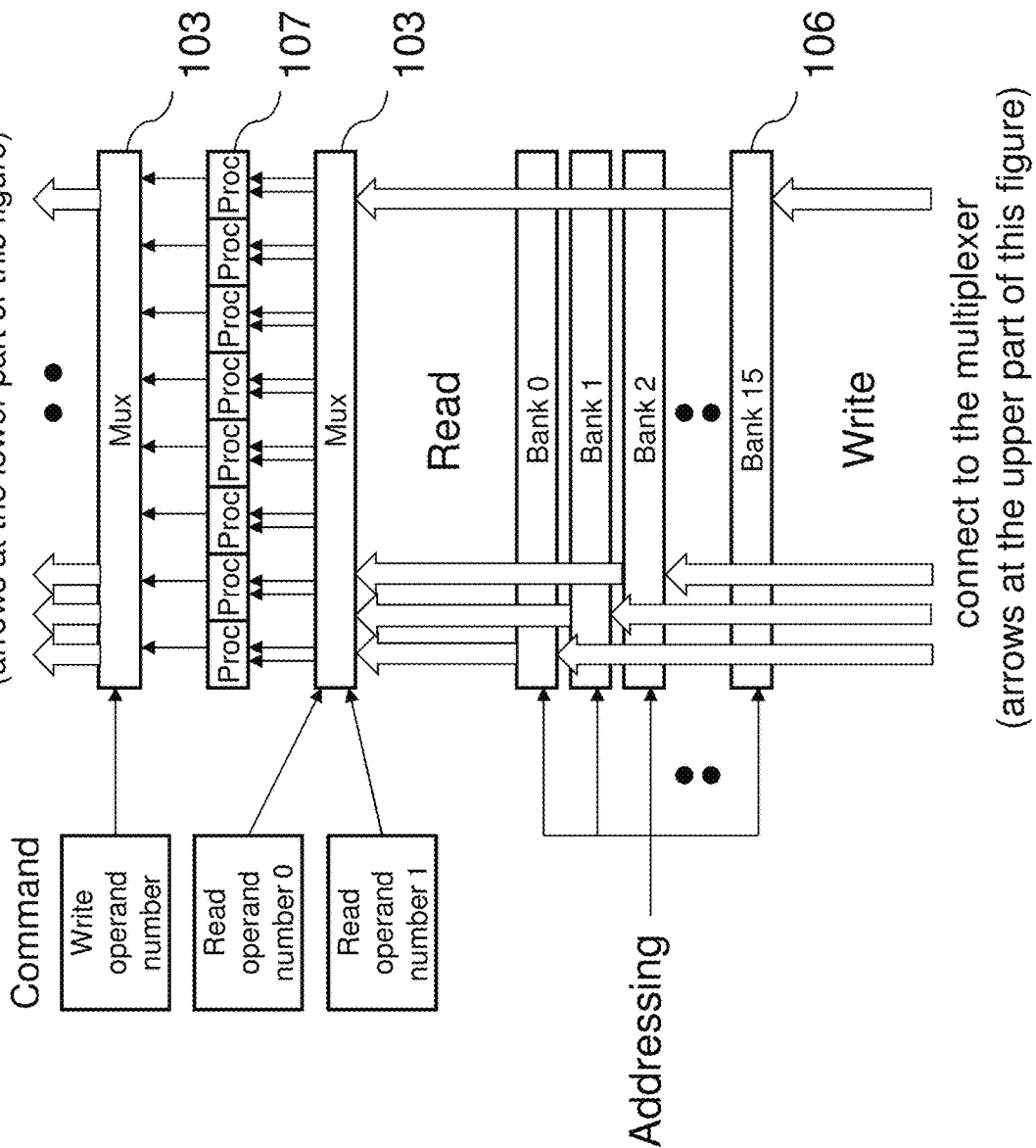
FIG. 6 is a figure which explains the structure of register memory in the multiprocessor device in accordance with an embodiment of the present invention.

FIG. 6 explains the above operation. For clarity, in FIG. 6 have divided the multiplexer 103 into the multiplexer 103 which does read operations and the multiplexer 103 which does write operations. As shown in FIG. 6, in the above operation SRAM is divided into 16 banks and common addressing is used, 2 operand numbers described in command are input into the multiplexer 103 (for clarity lower of the 2), required 2 operands are selected and input to the processor 107. Similarly, 1 write operand number described in command is input to the multiplexer 103 (for clarity upper of the 2) and is stored in SRAM specified by the result of operation of the processor 107

Actually the processor 107 processes in pipeline, hence there will be a latency of pipeline stage for read addressing and write addressing. Thus need to attach latency for write addressing through the use of FIFO memory. Addressing constantly changes thus furthering latency so that read/write collisions (addressing of the same address) does not occur.

Figure 7:
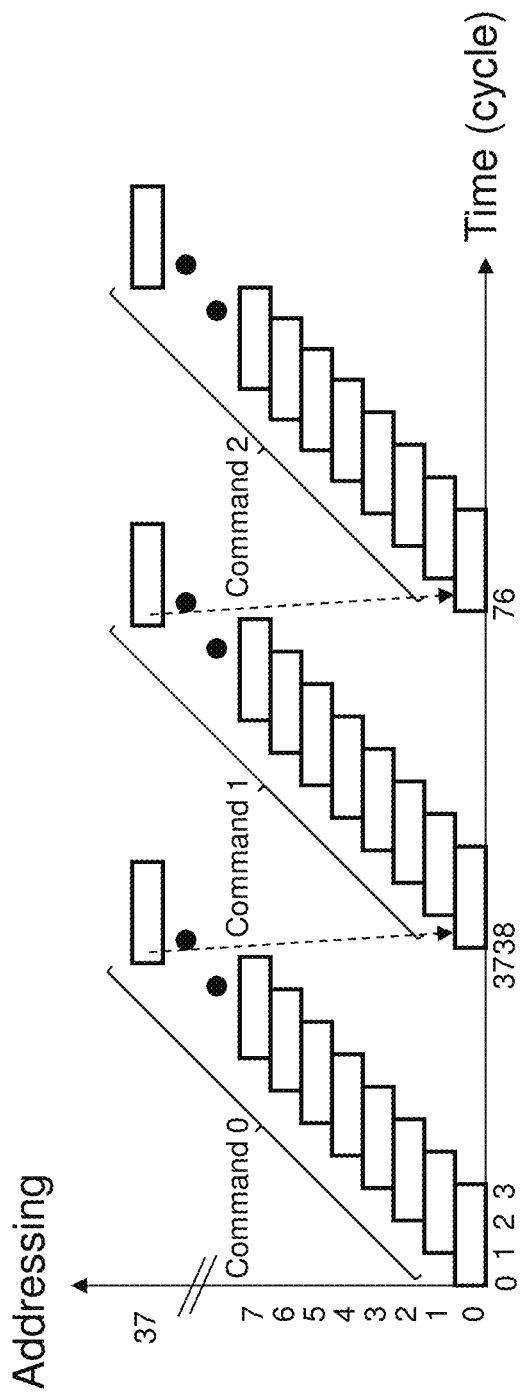
FIG. 7 is a figure which explains processing cycle and addressing of register memory when hazards do not occur in the multiprocessor device in accordance with an embodiment of the present invention.

The next command to change will be after processing of N=300 operations all completing. This is shown in FIG. 7. FIG. 7 shows addressing on Y-axis against time on X-axis. In FIG. 7, horizontal bar shows pipeline operations with left edge being read operands and right edge being write operands. Each of the 8 processors 107 executes same command till number of processes is N=300 so there is a difference of 38 cycles from execution of command 0 to command 1. Due to this difference even though there is flow dependency hazard does not occur. For example, for logical processor n command 0, [R0=R1 +R2] (R is register and subscript is number), command 1 [R3=R0*R0] is described so that even if R0 generated by command 0 is used by Command 1, and it being flow dependent, write of R0 of command 0 completes well before so that there is no problem.

This shows that no hazard problem occurs when number of operations N÷number of processors>pipelines stages. Which is to say that when number of processes is more than there is no degradation of performance when number of processors is increased or pipeline stages is increased.

This structure where performance does not degrade even when pipeline stages are increased is valid even when each of the processor 107 accesses the external memory 102 through the memory aggregate unit 101. The memory aggregate unit 101 basically combines multiple requests for close addresses for random memory accesses, and speeds up local memory access by providing cache. However the more that this kind of optimization is done, the more the fluctuations in the index of responsive speed which is where latency occurs. But if the limit of pipeline stage is high and conditions for hazard occurrence is low then this latency can also be absorbed to a certain extent. For example, for command 0 [R0=[R1]] ([ ] inside is memory address), for command 1 [R3=R0*R0] flow dependency is described, even then if memory latency is less than 38 cycles then there is no penalty.

Also, can increase the pipeline stages easily thereby being able to perform complex operations. For example, in CORDIC (Coordinate Rotation Digital Computer) method, it is possible to calculate trigonometric and hyperbolic functions using addition/subtraction as well as division could be done but required several tens of operations and so traditionally these faced restrictions in implementation. In this structure, there are no restrictions or specially required mechanisms in implementing this CORDIC. For example, for command 0 [R0=sin(R1)], command 1 [R3=arctan(R0)]

flow dependency is described, and there is no penalty if pipeline stages are below 38 cycles.

Further, generally registers operating at high operating frequency for read/write operations are constructed from flip flops, however with this structure there is ampleness in pipeline stages so that low cost SRAM can be used without problems. For example, when using SRAM which is pipelined, even though access time of a few cycles is required, throughput is 1 cycle so there is no problem.

On the other hand, as can be discerned from FIG. 7, command is unchanged for 38 cycles. Which means that the update frequency of commands is low and mechanism to speed up access of command cache is not required. This characteristic resolves the restrictions on length of command (word length) and is suitable for the implementation of VLIW (very long instruction word) which is a horizontal type command (operation unit is parallel and basically does not interfere mutually).

Figure 9:
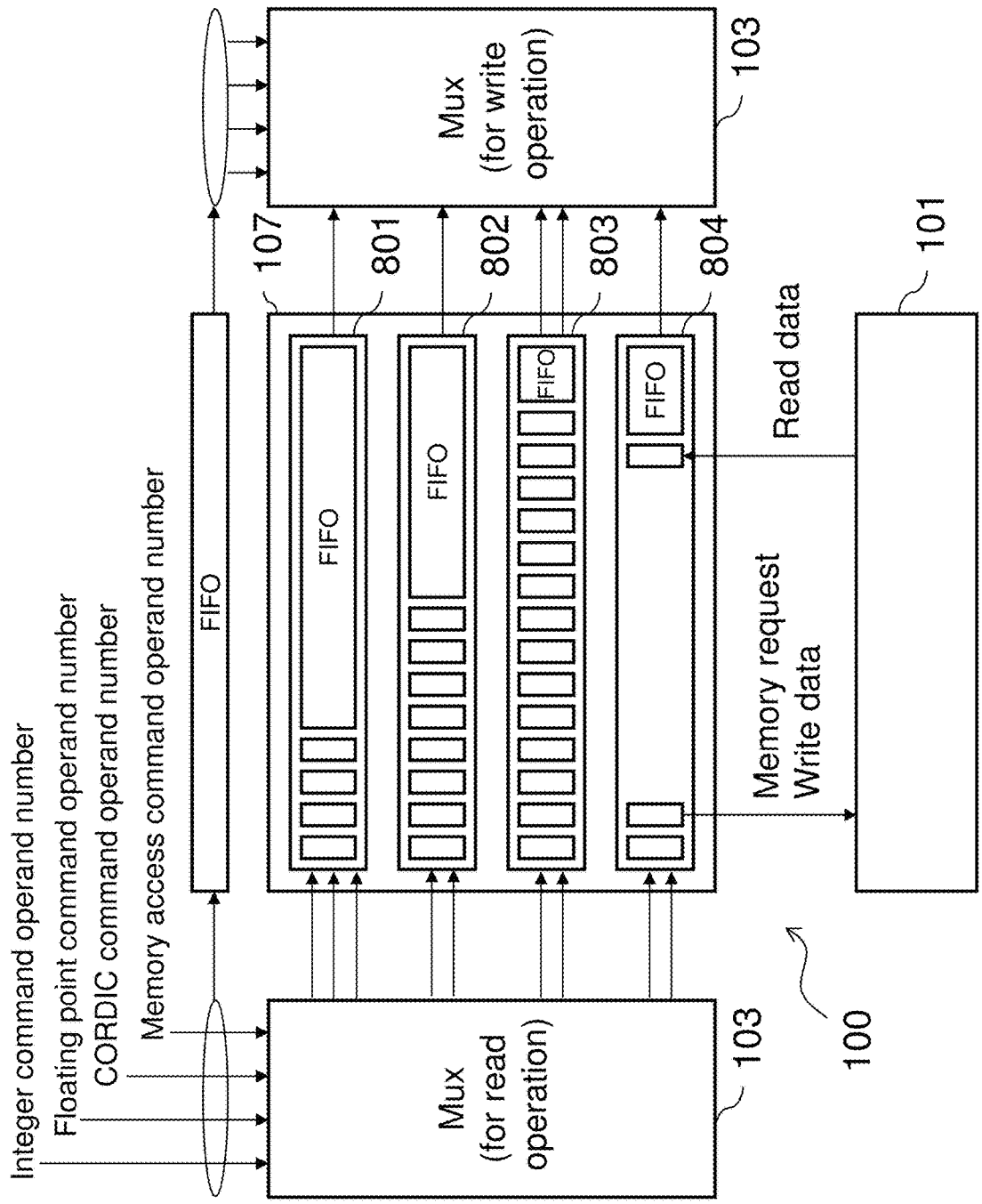
FIG. 9 is a figure which explains structure of a plurality of processing units of the multiprocessor device in accordance with an embodiment of the present invention.

FIG. 9 explains a multiprocessor device made up of a plurality of processing units. As shown in FIG. 9, this multiprocessor device 100 includes an integer unit 801 (for multiplication and addition), a floating point unit 802 (for multiplication and addition), a CORDIC unit 803 mentioned above (for trigonometric and hyperbolic functions), and a memory access unit 804. Each of the processor 107 includes the above and the multiplexer 103 selects and provides register required by commands of each of the units.

Each unit from 801 to 804 is in pipeline and as shown in the figure, each unit consumes 1 grid in 1 cycle for processing and the latency for each is different. For that reason, in this example, the difference in timing of FIFO memory is absorbed and synchronized when returning result to the multiplexer 103. As shown in FIG. 9, basically register read to register write is one directional and mutually non-interfering simple structure. This is a benefit in providing high speed.

With the above system, word length of commands can be easily extended. Also as the unit can be easily combined/separated (validating/invalidating), addition/subtraction of circuit can also be easily realized. As a result, it becomes easier to provide a multiprocessor device where the user can easily customize processing circuit according to the purpose.

The register memory 106 is basically accessed by each processor individually, however a shared access register can also be provided. This kind of register is used to reference a variable which is common to complete process. However, if a plurality of processors write to this shared access register, it is possible that an unexpected value will be written and to avoid this, it is favored to constitute such that a histogram is created from the total value written by each logical processor.

Here will explain about the second embodiment of a multiprocessor device of this invention. Will refer to FIG. 8 while explaining this embodiment.

As described above, in the multiprocessor device 100 of first embodiment, the effect is increased as the number of processes N increases. However, the number of logical processes (maximum number of processes) is fixed at 1024, hence need to provide for when the number of processes N is less than the number of logical processes as well as when the number of processes N is more than the number of logical processes.

When thinking of graphical processing, pixel operations per processor for QVGA size is 320×240=76,800 which number of processes is sufficiently large. On the other hand, the number of processes above are more than the number of maximum logical processors which is 1024, and hence need to divide the processing. Division is due to the system constitution, not changed for each command as is the case with a traditional processor, but is changed after the termination of a program.

For example will consider Affine transformation (rotation of image) of QVGA image. When describing this in a way similar to C language, it can be represented as below. Here variable x, y are the coordinates of QVGA, C0 to C5 are constants describing the rotation of Affine transformation, mem[ ][ ] is memory where each pixel of QVGA image is stored. In the below description, in R2 and R3, source coordinates which are calculated by Matrix computation (affine transformation) are stored, and data is read from source coordinates through R0, and the data read is then written to destination coordinates as stated by variables x and y.

```
for (y=0; y<240; y++)
    for (x=0; x<320; x++) {
        R2 = C0 * x + C1 * y + C2;
        R3 = C3 * x + C4 * y + C5;
        R0 = mem[R3][R2];
        mem[y][x] = R0;
    }
```

Variables x and y form a double loop, but Affine transform of above will be executed by the multiprocessor device 100 as per below execution method. Here, variable x will be scanned every 8 times which is the physical number of processors, and variable i will process 8 parallel processes for each processor. Thus for each step that variable y is incremented, one program is completely processed and this is repeated till the coordinate of Y reaches maximum.

```
for (y=0; y<240; y++) {
    for (x=0; x<320; x+=8)
        for (i=0; i<8; i++)
            R2 = C0 * (x+i) + C1 * y + C2;
    for (x=0; x<320; x+=8)
        for (i=0; i<8; i++)
            R3 = C3 * (x+i) + C4 * y + C5;
    for (x=0; x<320; x+=8)
        for (i=0; i<8; i++)
            R0 = mem[R3][R2];
    for (x=0; x<320; x+=8)
        for (i=0; i<8; i++)
            mem[y][x] = R0;
}
```

On the other hand, in the above processing, if do not wish to spend number of logical processes uselessly, and to avoid gaps in pipeline stages, for example, as shown below, can make the number of loops of variable y ⅓ and interpolating variable x by 3 times (may omit interpolation of the part referencing variable x and y). By doing this, can process 3 lines of pixels in direction followed by variable y combined into 1 line. Here have shown an example where 3 operations are combined into 1, however the number of operations which can be combined are not particularly restricted and can be arbitrarily set. Variable x can be maximum 960, so 1024−960=64 will be useless (For simplicity in explanation will omit optimization which could resolve the uselessness).

for ($y$=0;$y$<240/3;$y$++)

for ($x$=0;$x$<320*3;$x$+=8)

Similarly for HD size 1920×960, as shown below, number of loops of variable y is 2 times and variable x is interpolated by ½. By doing so, 1 line followed in variable y direction is divided into 2 lines and processed. Here have shown an example of 1 line being divided into 2 lines but there is no restrictions on the number of divisions and can be arbitrarily set.

for (y=0;y<960*2;y++)

for (x=0;x<1920/2;x+=8)

Program does not have to be consciously changed as above. The above interpolation can be easily calculated from the number of logical processors and size of image and the overall control unit 105 automatically adjusts. This adjustment can be made by calculating the ratio of maximum x coordinates not exceeding 1024 for example. Which is to say that even in this embodiment do not need to consider the number of logical processors or physical processors consciously and a traditional program can be given for operation.

Figure 8:
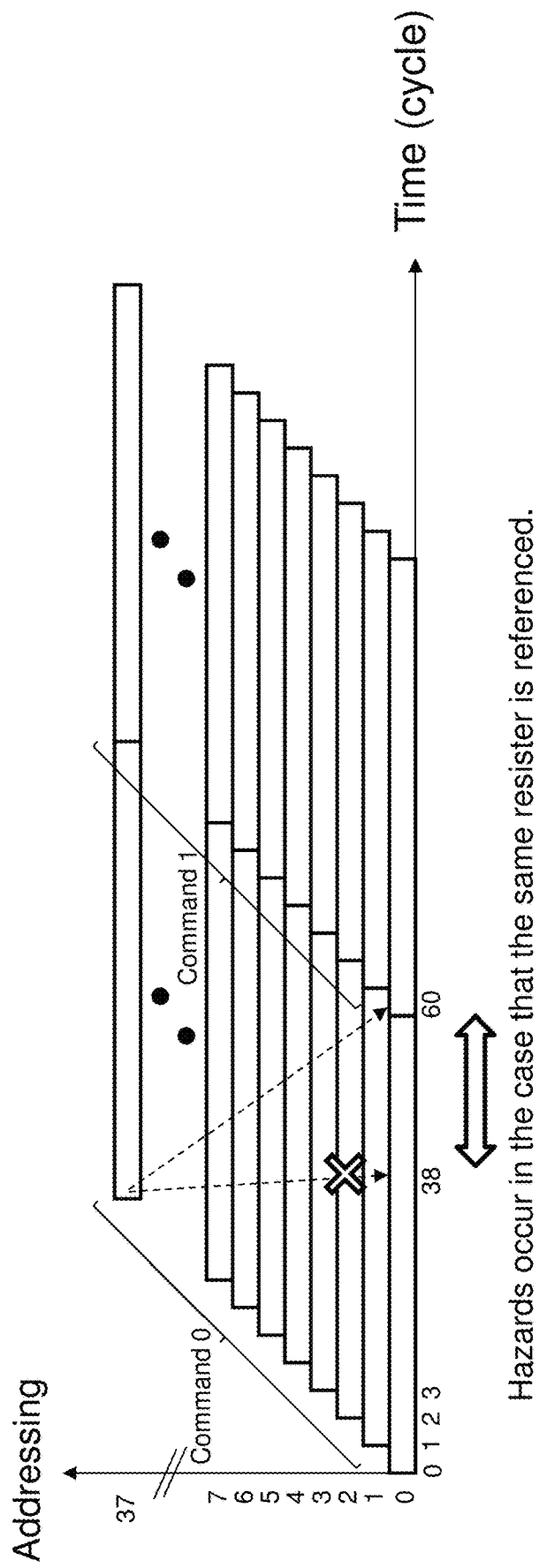
FIG. 8 is a figure which explains processing cycle and addressing of register memory when hazards occur in the multiprocessor device in accordance with an embodiment of the present invention.

However in image processing, there is not just 2 dimensional array processing, but also vector processing as in curved line drawing which cannot be interpolated and shortened. Also latencies which can not be absorbed by memory access can occur. FIG. 8 shows the hazards that can occur when the pipeline stages are 60. In this example, the processor 107 is started 38 times by command 0 and immediately thereafter the processor 107 cannot be started by command 1. Need to wait till cycle 60 for command 0 to complete. Which means that when switching commands and starting processing of new command, for the command being processed before the switch, until the execution of the processing order completes, new command processing needs to wait. Here processing order means the order of processing position of command for number of processors N. For example when the processing order is [10] means command which will be executed after 10 commands in number of processes N.

However even when commands are switched, if the same register is not referenced then no need to wait. Further for memory access, if it is done beforehand and memory value which is read is referenced after several commands, then number of processes N can be multiplied virtually by several times, and the fluctuation of latency can be greatly absorbed.

For the overall control unit 105 to dynamically control the above, need to detect flow dependency between consequent commands as well as slightly separated commands. However, for this control, brute force inspection of operand number is necessary. On the other hand can provide static flow dependency information to the overall control unit 105 also. The presence or absence of overlap of register number of consequent registers in a program will provide flow dependency information. For example, dependency between close commands n times before to be discarded will be translated by compiler. Which means, for pre-switch command, process order of new command is executed same as process order and until the operation specified beforehand of several commands in advance is not completed then until the specified operation completes new command needs to wait. In this case operation started after the predefined number of commands need not wait for the operation to complete and new command can be processed.

By the above control, even if the number of processes N, or number of processors, size of program changes, need not change the system constitution greatly and can hinder the occurrence of hazards.

Will explain third embodiment of multiprocessor device of this invention. Will explain by referring to FIGS. 6, 7, 10 and 11.

Firstly, same as in the second embodiment, in this embodiment also the multiprocessor device 100 will be used for Image Processing. This multiprocessor device 100 as shown in FIG. 7, successively processes commands by changing addressing, and addressing is followed in the X coordinate direction of image processing. Further, when commands finish execution in program, the next Y coordinate is processed again and terminates when the entire image is processed.

When inter-processor transmission for each of the processor 107 is performed on the external memory 102, data cycles both ways are required and is very inefficient. For example, when using filter operation which is a part of image processing, computation of left and right of pixel is required, and data once read is again required in following horizontal direction.

In this case, it is necessary to reference registers of different logical processors in horizontal direction, but as can be seen from FIG. 6, this kind of read can be realized by shifting the bank of the register memory 106. In the above described operation, command is the same executed for each of the processor 107, and hence operand number to be shifted and the amount of shifting is fixed. Therefore to realize the reference for horizontal direction, only need to provide from command amount to shift to the multiplexer 103 for read operation. In this case, amount of shift referenced relatively if described in the command. In the amount of shift, information about shift direction (addition or subtraction information) is included.

Further, addressing of the register memory 106 is changed according to above amount of shift. There are times when operands specifying amount of shift and operands not specifying amount of shift are computed simultaneously and hence the bank not specifying amount of shift can not be operated on.

Figure 10:
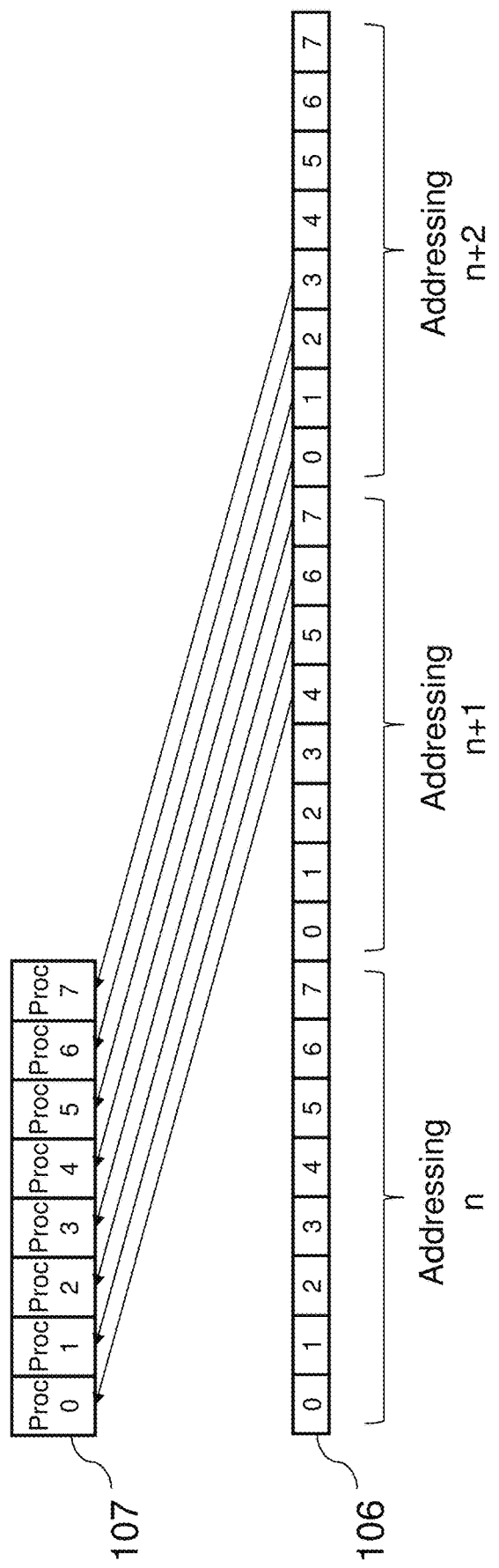
FIG. 10 is a figure which explains register access to different logical processors in the multiprocessor device in accordance with an embodiment of the present invention.

FIG. 10 references register of logical processor which is 12 separated in forward direction. As it is 12 separated, when addressing for processing is taken as n, then relative addressing overlaps from n+1 to n+2. For 1 addressing, 8 (unit of physical processors) consecutive data can be read so when these overlap then for the first addressing only to address 2 times. From the second addressing can remember the previously read data and hence for new addressing once is enough.

For example, for the first addressing only, when reading 8 data from addressing n+1 and 8 data from addressing n+2, local position number of unused addressing n+2 (remainder of logical processor divided by 8) data of [4] to [7] is stored. Then in the next addressing, 8 data of addressing n+3 is read. Using this, stored addressing n+2 local position number [4] to [7] data and newly read addressing n+3 local position number [0] to [3] data can be used. Then local position number [4] to [7] data which is not used for addressing n+3 is stored and used for the next operation.

As shown above, when there is reference of register in different processors by command of the overall control unit 105, start of addressing is accessed twice. However, in this example, even when different processors registers are referenced, if the reference is a relative reference in multiples of 8, then addressing will not overlap and 2 times access will not be required.

The multiplexer 103 as shown in FIG. 10, allocates data from addressing n+1 to physical processor number 0 to 3 and allocates data from addressing n+2 to physical processor number 4 to 7. For the former, logical processor's local position number 4 to 7 are shifted and respectively allocated. Similarly for the latter, logical processor's local position number 0 to 3 are shifted and allocated.

As shown above, registers of different logical processors can be referenced in horizontal direction.

Next will show method for referencing different logical processors in vertical direction. Here vertical direction processing is to compute on upper and lower pixels of an image.

As shown in FIG. 7, in this embodiment example of the multiprocessor device 100, until all the commands of X coordinates do not complete processing, different Y coordinate processing is not executed. Hence, it is not possible to reference a value being processed in a different Y coordinate. However, at the start of a new Y coordinate program, previously computed result of Y coordinate remains in the register memory 106. By referencing this, it is possible to use the register of logical processor of the smaller of Y coordinate.

Here will use register R0 to R3 as window and consider reusing the processed result of different Y coordinate. Which is to say that Rn (n=0 to 3) will store the processed result of current Y coordinate −4+n. At start of program, this R0 to R3 can be used as is, but when processing the next Y coordinate, need to update to new R0 to R3.

It is very inefficient to keep changing the program whenever the Y coordinate is updated, so for any Y coordinate processing, it is necessary for R0 to R3 to show the same relative position for the next Y coordinate process. Therefore, at the time X coordinate processing completes, need to transfer from R1 to R0, R2 to R1, R3 to R3 and transfer the current Y coordinate result into R3. When this is done programmatically, a few commands are consumed.

For this reason, for the multiplexer 103 which selects the register, lower 4 bits of Y coordinate is added to operand number of specified command. 4 bits can cover maximum number of registers (here maximum is 16). For example, when Y=0 then +0, Y=22 (10110) then +6 (0110), Y=23 (10111) then +7 (0111). At the time Y=23 is processing, R0 corresponds to R1 when processing Y=22. Like this, from R0 to R3 data is placed in order of oldest first which is also smallest of Y coordinate first.

The larger of Y coordinate value is not processed and hence cannot be referenced. However previous several results can be referenced, so if slightly smaller Y coordinate is processed, by referencing upper and lower, will be equivalent. For instance, when Y=100, data obtained when Y=96, 97, 98, 99 can be referenced. Although the operation is for Y=100, by centering operation at Y=98 data on both sides can be referenced.

Figure 11:
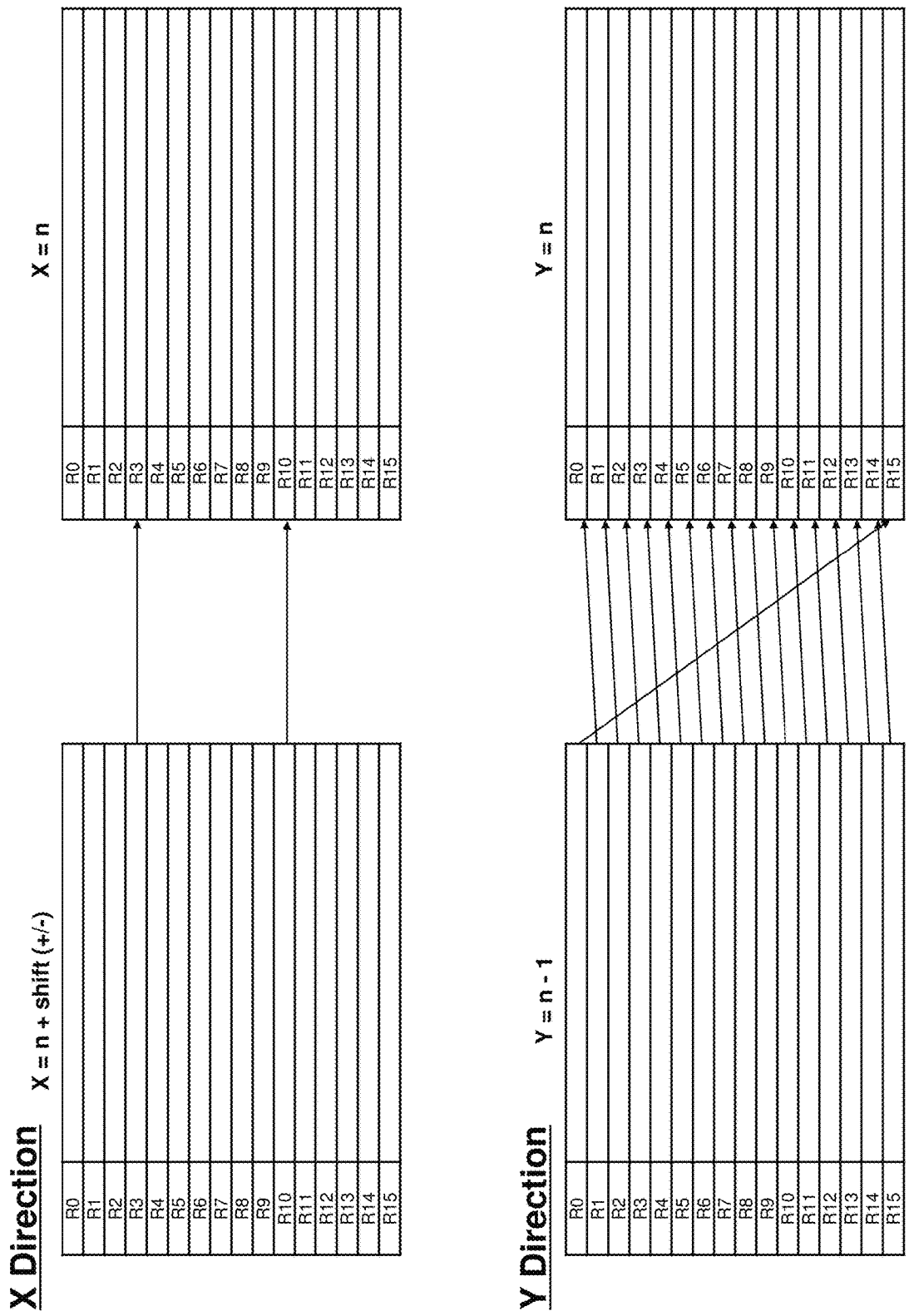
FIG. 11 is a figure which explains horizontal as well as vertical direction graphics processing in the multiprocessor device in accordance with an embodiment of the present invention.

From the above, and as shown in FIG. 11, referencing in horizontal direction, can be done specifying number of shifts (distance between logical processors) of command, referencing in vertical direction can be done by creating a program to reference intentionally provided registers window. Start and end point of horizontal as well as vertical directions (which means pixels at outer circumference) need edge processing using mirroring or copy. Mirroring processes so that when coordinate is −1 then it is 1 and when it is −2 then it is 2 and so forth, and copy processes so that when the coordinate is minus, then all coordinates are processed as 0. Not only when the coordinate is minus but also when the coordinate is more than the maximum the operation is similar.

Now will explain fourth embodiment of multiprocessor device of this invention. Will reference FIGS. 7, 9, 12 and 13 to explain this embodiment.

When there is a branch in a SIMD type processor, and since for all logical processors the same command is to be executed, even when branch is unnecessary, need to branch. When a branch occurs, write to registers is restricted, so that even when branched, processing is halted. Due to this, can realize a jump over part of the process of a program to the latter part of process. This means that it is necessary to store possibility of branch or not (branch flag) in order to accommodate multiple branches.

In this embodiment of the multiprocessor device 100, for each logical processor branch condition is stored, and using this stored information, processing is determined. Due to this, even when the same command is input to all the 8 processors 107, it is possible to branch separately for each of the processor 107. Here the register memory 106 is other than generally used register, also used for holding operation results such as carry or overflow and also above mentioned branch condition.

Considering 4 unit system shown in FIG. 9, operation result CC (condition code) is defined. In FIG. 9, condition code for the integer unit 801 and the memory access unit 804 is combined as CCint, for the floating point unit is CCmad, for the CORDIC unit is CCcor. CC is made up of 4 bits representing positive/negative N, Zero Z, Overflow V, and Carry C.

Figure 12:
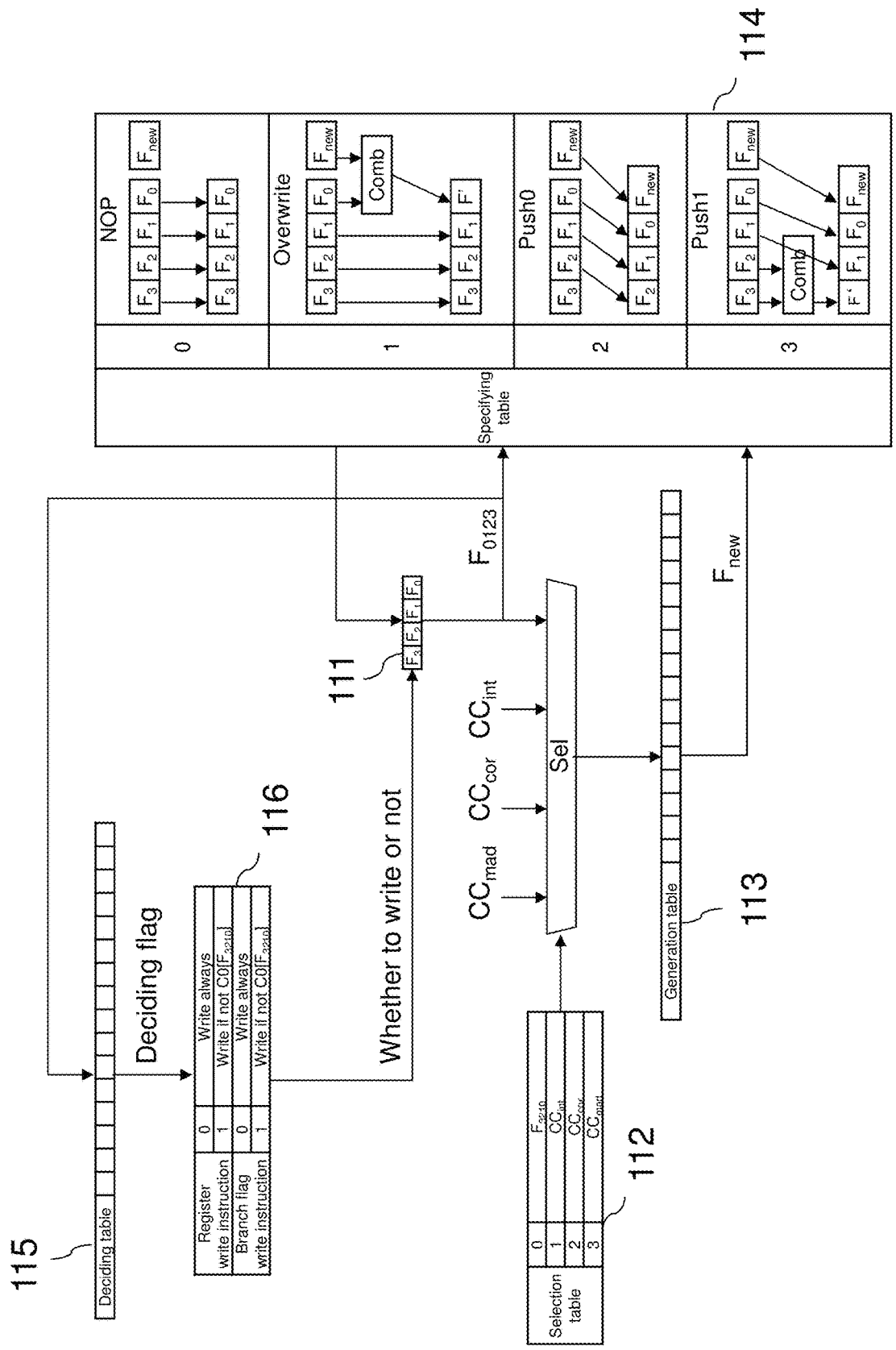
FIG. 12 is a figure which explains the generation of branch conditions of the multiprocessor device in accordance with an embodiment of the present invention.

FIG. 12 shows the process where branch flag F0 to F3 are generated. Branch flag 111 included in the register memory 106 is made up of 4 levels F0 to F3. Original information selected to generate the branch flag 111 is obtained from the selection table 112. This selection is specified within the command.

A generation table 113 represents all 4 bit combinations (2 to the 4th or 16 patterns), of original information in the selection table 112, and generates condition flag for update from condition of each bit of the 4 bit selection table. Generation of condition flag for update based on this generation table is also specified within the command.

A specifying table 114 is a table for generating (selecting) new branch flag which is a combination of the branch flag 111 and condition flag for update generated by the generation table 113. Generation of new branch flag based on this specifying table 114 is also specified within the command.

A deciding table 115 represents all the combinations of the 4 bit branch flag 111 (2 to the 4th which is 16 patterns), and is a table which generates (selects) deciding flag for each bit of 4 bits. Generation of the deciding flag in this deciding table 115 is also specified within the command.

A write specify table 116 is a table which decides whether to write to the register memory 106 or the branch flag 111 based on deciding flag generated by the deciding table 115. Decision of write based on this table is also specified within the command.

As shown in FIG. 12, the branch flag for update based on the selection table 112 is generated by either CC belonging to operation result of each unit (CCint, CCmad, CCcor) or the branch flag 111. For example, when requiring to set branch flag when N and Z of CCint NZVC is 1, the selection table 112 is assumed to be [1] and the generation table 113 is assumed to be [1111000000000000] in binary format (pattern where NZ both are set).

Next, how branch flag for update is incorporated by original branch flags for 4 levels is specified based on the specifying table 114. For example, when pushing the earliest flag and inserting in the space new branch flag, the specifying table 114 is set to [2]. The result generated based on this specifying table 114 is the next branch flag 111.

On the other hand, depending on the condition of branch flag 111 shown in FIG. 12, it is necessary to determine whether to write or not the operation result to register memory 106 or to write or not the branch flag 111. For example, when changing the 2 bits F0 and F1 of the branch flag 111 and building 4 conditions, the deciding table 115 is set according to each condition, and the specify table 116 is set to [1] and processed. Explaining the above in a C like language below (for loop relating to multiprocessor is omitted).

```
switch (F0,F1) {
    case 00:
        R0 = R1 + R2;
        break;
    case 01:
        R0 = R1 + R2;
        break;
    case 10:
        R3 = R4/R1;
        break;
    case 11:
        R0 = R1 + R2;
        R3 = R4/R1;
        break;
}
```

Commands to be given to the processor 107 can be just these 2, R0=R1+R2, and R3=R4/R1. And, when F0 and F1 are [10] then R0=R1+R2 can be set to be inactive (the deciding table 115 is 0100010001000100 in binary which is 0x4444). Further, when F0 and F1 are [00] and [01], R3=R4/R1 is inactive (the deciding table 115 is 0011001100110011 in binary which is 0x3333). In this case the program to be given to the processor 107 will be as follows. Here, Judge[ ] is binary table which is an index, and F3210 is branch flag which is bit joined from F3 to F0.

Judge=0x4444; if (!Judge[*F3210*])*R0=R1+R2*;

Judge=0x333; if (!Judge[*F3210*])*R3=R4/R1*;

As explained above, in this embodiment, even with the same command, depending on the condition of each logical processor (condition code), different operation can be efficiently performed.

Next will illustrate how to branch to numbered program according to condition when program number is attached to command.

Branch to program number will be a branch for each of the logical processors, so need to determine which condition necessitates the branch. This condition can be for example, decision flag indexed by above stated deciding table 115 can be true for all logical processors or can be true for only 1 processor or can also be the opposite of true.

This condition can be included in the command, however for instance if there is a loop after branch, there could be times when condition to break the loop will not be true. This is because for individual logical processor the condition may be true to break out of the loop, but for all logical processors (excepting the part not processing), to break out of the loop there may be times when the condition is not true. Hence, it is necessary to include the loop count along with the condition in the command.

Here when you see FIG. 7, switch from command 0 to command 1 will occur after the last addressing of command 0 completes. Parameter affecting command 0 (specify operand) is fine if read once and stored, and regarding command 1, is fine if pre-read right after the cycle where command 0 is read. In this case, parameter can be stacked in FIFO memory etc.

However when branching, until cycle 37 of command 0, branch flag determination for all logical processors is not done. If command after the branch at cycle 37 of command 0 is attempted to be obtained, then start-up of the processor 107 is delayed by that amount. This leads to performance deterioration.

To solve this, will use delayed branch. Delayed branch is even when command 0 is branch command and command 1 is executed unconditionally, and upon termination of command 1 it branches. By this operation, parameter of command 1 is obtained while command 0 is executing, and parameter of command after branch when command 0 terminates while command 1 is executing is obtained so that the processor 107 continuously executes.

Below is an example of program which uses branch command of system of FIG. 9. It is a program which illustrates convergence count of recurrence formula $X_{n+1}=X_n*X_n-Y_n*Y_n+a$, $Y_{n+1}=2X_nY_n+b$ in image generation of 64×64 Mandelbrot Union (fractal shape on complex surface). Line numbers after for command are command numbers, and 5 commands are used. Among these, command 2 and 3 loop a maximum of 64 times, and after count of convergence, the value is deemed to be pixel value.

```
for (y=0; y<64; y++)
    for (x=0; x<64; x++) {
        0: R4 = 1/16 * x - 2; R3 = F3210 = 0;
        1: R5 = 1/32 * y - 1; R0=R1=0;
        2: R2 = R0 * R0 - R1 * R1 + R4; R8 = sqrt(R1 * R1 - 4);
            R3 += 1;
            Judge = 0xaaaa; if (!&Judge[F3210] & (Loop < 64)) goto 2;
            Form = 0x3333; F0 |= Form[CCcor];
        3: R1 = (R0 * R1 + R5) * 2; R9 = sqrt(R2 * R2 - 4); R0 = R2;
            Form = 0x3333; F0 |= Form[CCcor];
        4: mem[x][y] = R3;
    }
```

Command 0 and 1 rationalize X and Y coordinates of operation and initialize the branch flag 111 and initialize variables.

Command 2 calculates recurrence formula (R2) using the floating point unit 802, and calculates convergence determination (R8) using the CORDIC unit 803. Further, increments convergence count R3. Here, checking F0 of the branch flag 111, for all logical processors (omitting the parts which are not included in operation), which are not 1, loops command 2 ([!&] symbol in command means negate). Maximum loops are set at 64, and since it is delayed branch, command 3 will always be executed. Further if the result of the CORDIC unit 803 is not overflow V (cannot be described which is R*R-2*2<0), to overwrite F0. This shows that when R1 is above 2 then it diverges and terminates.

Command 3 similar to command 2, calculates recurrence formula (R1) using the floating point unit 802 and convergence decision (R9) using the CORDIC unit 803. Branch flag F0 also same as for command 2 is determined and result is overwritten.

Command 4 writes degree of convergence to the external memory 102.

Figure 13:
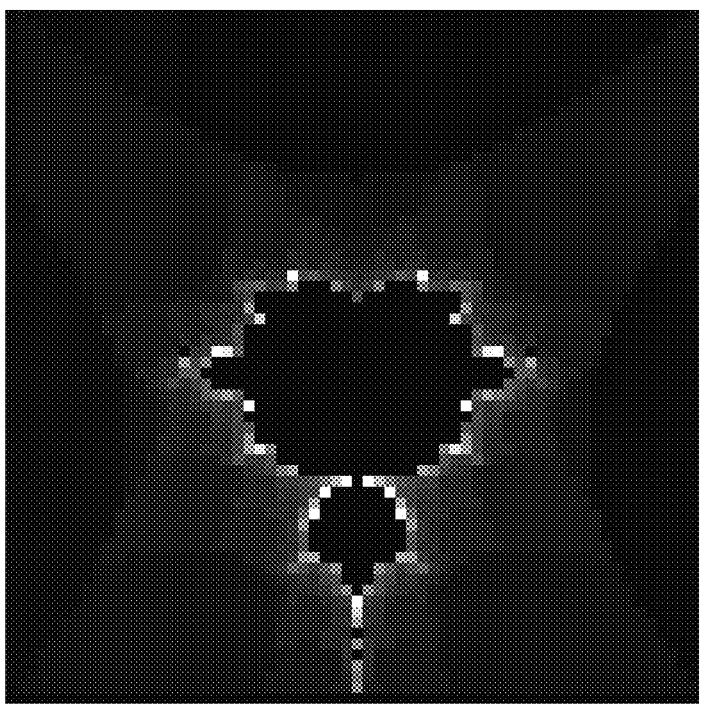
FIG. 13 is a figure which shows an example image generated by branch conditions in the multiprocessor device in accordance with an embodiment of the present invention.

When the above program is executed, simulation result shown in FIG. 13 is obtained. Program loops command 2 and 3 so on average consumes 2 cycles, and on average if it converges n 16 cycles, and if 8 processors are used, for 1 pixel 2×16/8=4 cycles performance can be obtained. If this is done by a traditional processor, then for conditional branch and operation several cycles are required, a difference in the magnitude of several orders will happen.

In this way, by aggregating branch flags, it is possible to execute the program with small number of commands. Especially in a system where the operating units are placed in parallel to reduce the number of commands, maximum efficiency can be realized.

As explained above, in these details, a multiprocessor device is disclosed comprising external memory, a plurality of processors, external memory, a plurality of processors, a memory aggregating device, register memory, a multiplexer and an overall control unit. In this structure, a memory aggregating device aggregates memory accesses to the plurality of processors. The register memory is prepared by a number equal to the product of the number of registers managed by the plurality of processors and the maximum number of processes of the plurality of processors. The multiplexer accesses the register memory according to a command given against the register access of the plurality of processors. The overall control unit extracts a parameter from the command and provides the extracted parameter to the plurality of processers, and controls the plurality of processers and the multiplexer, as well as has a given number of processes consecutively processed using same command while having addressing for the register memory changed by each of the plurality of processors and, when the given number of processes ends, have the command switched to a next command and processing repeated for a given number of processes.

For the above configuration, the overall control unit can be implemented so that when the given number of processes is more than the maximum number of processes, then the processes can be divided and executed and when the given number of processes is less than the maximum number of processes, then the processes can be combined and executed.

Further, in the above configuration, in the case that the overall control unit switches the command to execute a new command, when the process being executed in the same processing order as the new command processing order for the command before the switch, is not complete, a configuration in which the overall control unit delays a processing for the new command till the process is complete can be adopted. Further, when a register write position of the process being executed in the same processing order as the new command processing for the command before the switch is same as a read register position of the processing of the new command, a configuration in which the overall control unit delays a processing for the new command till the process is complete can be adopted. Or, when the process being executed in the same processing order as the new command processing order for the command before the switch, the command before switch being specified beforehand by the number of commands, is not complete, a configuration in which the overall control unit delays a processing for the new command till the process is complete can be adopted. In this case, the overall control unit does not have to check for processes executed after the number of commands specified beforehand, and can execute process for new command.

Further for the above configuration, a configuration in which the overall control unit extracts relative shift amount regarding the processing order for each of the plurality of processors from the given command and provides the extracted shift amount to the multiplexer, and instructs the addressing for the register memory will be stated 2 times initially when the extracted shift amount is not a multiple of integer value of the number of the plurality of processors can be adopted. In this case, a configuration in which the multiplexer extracts data by shifting data according to the shift amount using data obtained from the addressing for the register memory and data obtained from a previous addressing and provides the extracted data to the plurality of processors can be adopted. By this configuration, just by shifting data and addressing when there is register access, data transfer between processor can be realized and is effective for 2D processing in Image processing.

Further, in the above mentioned configuration, a configuration in which the plurality of processors generates a flag which state a branch condition from the given command and each operation result, combines multiple branch flags stored in register memory to make new branch flag according to the command, and stores the new branch flag into the register memory can be adopted. In this case, the plurality of processors determines whether to write or not operation result to the register memory or whether to move or not to a specified command based on the given command and each of the multiple branch flags stored in the register memory. Using this structure, against the weak point of the multiprocessor device which is the branch, by condensing multiple conditions, it is possible to reduce the commands consumed.

INDUSTRIAL APPLICABILITY OF INVENTION

The multiprocessor device of this invention can be applied to applications that use computing systems such as AV devices, Mobile phones, Mobile terminals, computer equipment, car control units, medical equipment etc.

EXPLANATION OF REFERENCE SIGNS 100 multiprocessor device
101 memory aggregate unit
102 external memory
103 multiplexer
105 overall control unit
106 register memory
107 processor

The invention claimed is:

1. A multiprocessor device for executing vector processing commands comprising:
   external memory;
   a plurality of processors;
   a memory aggregate unit configured to aggregate memory accesses of the plurality of processors;
   a register memory having registers whose number is equal to a product of a number of registers managed by the plurality of processors and a maximum number of processes executed by the multiprocessor device in response to one command, the maximum number of processes being predetermined;
   a multiplexer configured to access the register memory according to a command given against a register access of the plurality of processors; and
   an overall control unit configured to extract a parameter from the command, provide the extracted parameter to the plurality of processors and the multiplexer, and control the plurality of processors and the multiplexer, and configured to acquire a number of processes on which to use a same command by each of the plurality of processors; and wherein
   each of the plurality of processors consecutively processes the same command by changing addressing for the register memory until each process finishes upon which the overall control unit switches to a next command to process until all commands are executed, and for each command, an access address of each of the plurality of processors is changed to a new access address by changing addressing for the register memory, the new access address being obtained by adding a number of the plurality of processors to the access address of each of the plurality of processors.

2. The multiprocessor device according to claim 1, wherein the overall control unit is configured to
divide the processes,
execute when the given number of processes is more than the maximum number of processes, and
combine the processes and execute when the given number of processes is less than the maximum number of processes.

3. The multiprocessor device according to claim 1, wherein,
in the case of switching the command to a new command, the overall control unit is configured to delay a processing for the new command, when the process, for the command before the switch, being executed in a same processing order as a processing order of the new command is not complete, until the process for the command before the switch is complete.

4. The multiprocessor device according to claim 1, wherein
the overall control unit is configured to extract a relative shift amount regarding a processing order for each of the plurality of processors from the given command and provide the extracted shift amount to the multiplexer, and instruct the addressing for the register memory will be stated 2 times initially when the extracted shift amount is not a multiple of integer value of the number of the plurality of processors, and
the multiplexer is configured to extract data by shifting data according to the shift amount using data obtained from the addressing for the register memory and data obtained from a previous addressing and provides the extracted data to the plurality of processors.

5. The multiprocessor device according to claim 1, wherein
the plurality of processors are configured to generate a flag which states a branch condition from the given command and each operation result, combine multiple branch flags stored in the register memory to make a new branch flag according to the command, and store the new branch flag into the register memory, and
the plurality of processors are configured to determine whether to write or not operation result to the register memory or whether to move or not to a specified command based on the given command and each of the multiple branch flags stored in the register memory.

6. The multiprocessor device according to claim 1, wherein,
in the case of switching the command to a new command, the overall control unit is configured to delay a processing for the new command, when a register write position of the process, for the command before the switch, being executed in a same processing order as a processing order of the new command is same as a read register position of the process of the new command, until the process for the command before the switch is complete.

7. The multiprocessor device according to claim 1, wherein,
in the case of switching the command to a new command, the overall control unit is configured to delay a processing for the new command, when the command before the switch being specified beforehand by the number of commands and being executed in a same processing order as a processing order of the new command is not complete, until the process for the command before the switch being specified beforehand by a number of commands is complete.

8. The multiprocessor device according to claim 1, wherein
the access address of each of the plurality of processors processing the next command for reading data and the access address of each of the plurality of processors processing the command immediately before the next command in a same processing order as a processing order of the next command for writing data are a same address.

9. The multiprocessor device according to claim 8, wherein,
in one cycle, the access address of each of the plurality of processors processing the same command for reading data and the access address of each of the plurality of processors processing the same command for writing data are determined by a number of pipeline stages.

10. A multiprocessor device for executing vector processing commands comprising:
external memory;
a plurality of processors;
a memory aggregate unit configured to aggregate memory accesses of the plurality of processors;
a register memory having registers whose number is equal to a product of a number of registers managed by the plurality of processors and a maximum number of processes executed by the multiprocessor device in response to one command, the maximum number of processes being predetermined;
a multiplexer configured to access the register memory according to a command given against a register access of the plurality of processors; and
an overall control unit configured to extract a parameter from the command, provide the extracted parameter to the plurality of processors and the multiplexer, and control the plurality of processors and the multiplexer, and configured to acquire a number of processes on which to use a same command by each of the plurality of processors; wherein
each of the plurality of processors consecutively processes the same command by changing addressing for the register memory until each process finishes upon which the overall control unit switches to a next command to process until all commands are executed, and
for each command, an access address of each of the plurality of processors is changed to a new access address by changing addressing for the register memory, the new access address being specified by the overall control unit using a predetermined operation.

11. The multiprocessor device according to claim 10, wherein the access address of each of the plurality of processors processing the next command for reading data and the access address of each of the plurality of processors processing the command immediately before the next command in a same processing order as a processing order of the next command for writing data are a same address.

* * * * *